Patented Apr. 25, 1933

1,905,340

UNITED STATES PATENT OFFICE

LOUIS BURGESS, OF NEW YORK, N. Y.

METHOD OF CONCENTRATING BERYLLIUM OXIDE OCCURRING IN MATERIALS CONTAINING BERYLLIUM SILICATE OR SILICATES

No Drawing. Application filed January 16, 1932. Serial No. 587,125.

The term materials containing beryllium silicates connotes materials consisting either in whole or in part of beryllium silicates.

The element beryllium occurs almost universally in the form of beryllium oxide, and in the majority of the native forms the beryllium oxide is combined with silicon oxide to form a silicate which may be either a simple beryllium silicate or a complex silicate in which other metallic elements are present. Pure beryllium oxide may be prepared from such materials either by a wet process or by the process described in my U. S. Patent No. 1,418,527, issued June 6, 1922. In either case, however, owing to the relatively low content of beryllium oxide in the majority of materials, a preliminary concentration of the beryllium oxide is advisable for maximum economy of operation; and for certain purposes the concentrate prepared in accordance with the present process may be utilized without further purification.

The process is applicable generally to materials containing beryllium silicate or silicates. I intend by this phrase to include, inter alia, the crude ore as mined, and in addition the product of any physical process of separating the beryllium silicate compounds from associated uncombined material. Such preliminary segregation of the beryllium silicate compounds may, for example, be effected by hand picking, levigation, electrostatic separation, use of a minerals separation table or by flotation.

In accordance with my process, the material is ground and mixed with carbon sufficient to reduce at least a part of the silicon oxide present, but insufficient to reduce both the silicon oxide and a substantial proportion of the beryllium oxide. The beryllium ore and admixed carbon is then subjected to heat sufficient to cause the carbon to react with the oxide material present and effect a reduction. This reduction will selectively attack the silicon oxide with the formation of carbon monoxide and silicon, while leaving the beryllium oxide substantially unreduced. While concentration will be effected by the addition of carbon which is insufficient to reduce the total silicon oxide, the best results will be obtained by the addition of carbon in amount stoicheometrically sufficient to reduce substantially all of the silicon oxide. The reduction may be carried out with any suitable type of furnace in which the temperature of reduction may be obtained. The temperature may be generally stated to lie in the neighborhood of 1700 to 1900° C., and for this reason an electric furnace, either of the arc or resistance type, is practically essential. The preferred furnace is an electric arc furnace, either single or multiphase, and the most convenient type of furnace to employ appears to be a single phase arc furnace with a carbon bottom or pit and a single central carbon electrode so connected that the current passes between the central electrode and the carbon bottom. Furnaces of this type are commonly employed for the manufacture of calcium carbide, ferro-manganese, ferro-silicon, etc. After reduction, the silicon formed is no longer in combination with the beryllium oxide, but exists as a separate and independent phase. It may occur in the form of globules disseminated throughout the remaining oxide, and, in any event, by reason of the fact that it is no longer combined, may be physically separated from the beryllium oxide. This may be accomplished, for example, by grinding the material and then subjecting it to any suitable separation process.

In one preferred embodiment of my invention, an iron producing material is added to the material containing the beryllium silicate, either simultaneously with or prior to the reduction. By the term iron producing material, I desire to comprehend either iron, per se, or a mixture which will form iron under the conditions of reduction, as for example iron oxide, together with carbon sufficient to reduce the iron oxide in addition to that necessary for the reduction of the silicon oxide. The iron may be conveniently added in the form of rolling mill scale which is principally magnetite. The iron may be sufficient to form a magnetic alloy with the silicon formed by reduction of the silicon oxide. In this case, after heating the mixture to a temperature at which reduction of the iron oxide and silicon oxide by the carbon takes place, the material will contain beryllium oxide and an alloy of iron and silicon. After grinding the material, the oxide may be separated from the silicon iron alloy by the process of magnetic separation. Preferably, however, the amount of iron producing material added is sufficient to form an alloy with the silicon containing not less than 50% of iron. The reduction may be somewhat more easily carried out if the charge is so proportioned that the resulting alloy contains from 60 to 70% of iron. Such an alloy is fluid at the temperature of reduction and will ordinarily separate in the lower part of the furnace from which it may be removed by tapping in the usual manner. If the heating conditions are controlled to maintain a temperature above the melting point of the oxide material, the unreduced material will also be liquefied and may be simultaneously tapped out of the furnace into a suitable receiving vessel, which may, of course, be merely a temporary enclosure built up of fire-brick. In the receiving vessel the alloy will segregate at the bottom and the oxide will separate as a slag on the surface of the alloy. When the tap is cooled, the oxide may be detached. The corresponding separation could be effected while the alloy and oxide were both fluid, but would present greater difficulties owing to the temperature involved.

The unreduced material contains the concentrated beryllium oxide and may be utilized in a variety of ways. It may, for example, be further purified for the manufacture of pure beryllium oxide either by a wet process or by the process disclosed in my U. S. patent hereinabove referred to. The concentrated beryllium oxide may also be finely ground and added gradually to a fluoride electrolyte undergoing electrolysis in series with a suitable anode and cathode, whereby the beryllium oxide will be dissociated and beryllium liberated at the cathode. The concentrated beryllium oxide may also be ground and admixed with carbon and a copper producing material and then reduced in a suitable electric furnace to form a copper beryllium alloy. Such reduction is preferably carried out under pressure in a furnace of the type described in my U. S. Patent No. 1,512,271, issued October 21, 1924. The copper beryllium alloy so prepared may be utilized for the formation of copper alloys of high tensile strength, or may alternatively be subjected to electrolysis in the manner described in my copending application Serial No. 504,451 for the manufacture of pure beryllium or the lighter alloys of beryllium.

Beryllium commonly occurs in the form of the mineral beryl which is a beryllium aluminum silicate. The beryl is ordinarily separated by hand picking from the associated gangue to produce an ore containing at least 10% of beryllium oxide in combination with a slightly greater percentage of aluminum oxide. In this case the added carbon is sufficient to reduce at least a part of the silicon oxide present but insufficient to reduce in addition either the beryllium or silicon oxide. The added carbon is preferably sufficient to reduce substantially all of the silicon oxide. The mixture of divided beryl and added carbon is then subjected to reduction in any suitable type of furnace, preferably a single phase arc furnace of the type hereinbefore described. The silicon formed by reduction may be separated in any suitable manner. Where an iron producing material is preliminarily added, the resulting silicon iron alloy can be separated by the magnetic process. In the preferred practice, the amount of added iron producing material is sufficient to form an alloy containing at least 50% of iron and preferably at least 60%. In this case the alloy formed on reduction will stratify and separate from the unreduced oxide, and the temperature is preferably controlled by regulation of the voltage and amperage at the furnace to maintain a temperature in excess of the melting point of the unreduced oxide material so that both the oxide and alloy will flow out of the tapping duct of the furnace and will be found as separate layers easily separable from one another when the tap is cooled.

The unreduced material remaining will contain in this case the beryllium and aluminum oxides. It may be finely ground and added gradually to a fluoride electrolyte undergoing electrolysis in series with a suitable anode and cathode, whereupon an alloy of aluminum and beryllium will be formed at the cathode by electrolytic dissociation. Alternatively, the material may be subjected to a further purification either by the wet process or by the process disclosed in my U. S. Patent No. 1,418,527. The material may also be reduced directly with copper in an electric furnace to form a beryllium aluminum copper alloy. This reduction is preferably carried out under pressure in a furnace of the type described in my U. S. Patent 1,512,271. The copper alloy so formed may be utilized for the formation of copper alloys of high tensile strength or may alternatively be made the anode in a fluoride electrolyte with the resultant formation of a beryllium aluminum alloy in accordance with the method described in my copending application Serial 504,451.

Inasmuch as the foregoing description is for purposes of illustration, it is my intention that the invention be limited only by the appended claims or their equivalents wherein I have endeavored to claim broadly all inherent novelty.

I claim:

1. Process of concentrating beryllium oxide occurring in materials containing beryllium silicate, which comprises admixing such a material with sufficient carbon to reduce to silicon at least a part of the silicon oxide in said material, subjecting the mixture to heat sufficient to cause the admixed carbon to reduce at least a part of the said silicon oxide, thereby producing silicon and unreduced oxide, and separating the said silicon from the oxide.

2. Process of concentrating beryllium oxide occurring in materials containing beryllium silicate, which comprises admixing such a material with an iron producing material and with sufficient carbon to reduce to silicon at least a part of the silicon oxide in said material, subjecting the mixture to heat sufficient to cause the admixed carbon to reduce at least a part of the said silicon oxide, thereby producing an alloy containing silicon and iron and unreduced oxide, and separating the said alloy from the oxide.

3. Process of concentrating beryllium oxide occurring in materials containing beryllium silicate, which comprises admixing such a material with sufficient carbon to reduce to silicon at least a part of the silicon oxide in said material and with sufficient iron producing material to form an alloy containing not less than 50% of iron with the said silicon, subjecting the mixture to heat sufficient to cause the admixed carbon to reduce at least a part of the said silicon oxide, thereby producing an alloy containing silicon and not less than 50% of iron and producing unreduced oxide, and separating the said alloy from the oxide.

4. Process of concentrating beryllium oxide occurring in materials containing beryllium silicate, which comprises admixing such a material with sufficient carbon to reduce to silicon at least a part of the silicon oxide in said material and with sufficient iron to form an alloy with the said silicon containing not less than 50% of iron, subjecting the mixture in a suitable furnace to heat sufficient to cause the admixed carbon to reduce at least a part of the said silicon oxide, thereby producing an alloy containing silicon and not less than 50% of iron and producing unreduced oxide, introducing heat sufficient to liquefy the said alloy and to liquefy the unreduced oxide, tapping the said alloy and oxide from the said furnace, permitting the alloy and oxide to stratify, and separating the oxide from the said alloy.

5. Process of concentrating beryllium oxide occurring in materials containing beryllium silicate, which comprises admixing such a material with sufficient carbon to reduce to silicon the silicon oxide in said material, subjecting the mixture to heat sufficient to cause the admixed carbon to reduce the said silicon oxide, thereby producing silicon and unreduced oxide, and separating the said silicon from the oxide.

6. Process of concentrating beryllium oxide occurring in materials containing beryllium silicate, which comprises admixing such a material with an iron producing material and with sufficient carbon to reduce to silicon the silicon oxide in said material, subjecting the mixture to heat sufficient to cause the admixed carbon to reduce the silicon oxide, thereby producing an alloy containing silicon and iron and producing unreduced oxide, and separating the said alloy from the oxide.

7. Process of concentrating beryllium oxide occurring in materials containing beryllium silicate, which comprises admixing such a material with sufficient carbon to reduce to silicon the silicon oxide in said material and with sufficient iron producing material to form an alloy containing not less than 50% of iron with the said silicon, subjecting the mixture to heat sufficient to cause the admixed carbon to reduce the said silicon oxide, thereby producing an alloy containing silicon and not less than 50% of iron and producing unreduced oxide, and separating the said alloy from the oxide.

8. Process of concentrating beryllium oxide occurring in materials containing beryllium silicate, which comprises admixing such a material with sufficient carbon to reduce to silicon the silicon oxide in said material and with sufficient iron to form an alloy with the said silicon containing not less than 50% of iron, subjecting the mixture in a suitable furnace to heat sufficient to cause the admixed carbon to reduce the said silicon oxide, thereby producing an alloy containing silicon and not less than 50% of iron and producing unreduced oxide, introducing heat sufficient to liquefy the said alloy and to liquefy the unreduced oxide, tapping the said alloy and oxide from the said furnace, permitting the alloy and oxide to stratify, and separating the oxide from the said alloy.

9. Process of concentrating beryllium oxide occurring in materials containing beryllium silicate and aluminum silicate, which comprises admixing such a material with sufficient carbon to reduce to silicon at least a part of the silicon oxide in said material, subjecting the mixture to heat sufficient to cause the admixed carbon to reduce at least a part of the said silicon oxide, thereby producing silicon and unreduced oxide, and separating the said silicon from the oxide.

10. Process of concentrating beryllium oxide occurring in materials containing beryllium silicate and aluminum silicate, which comprises admixing such a material with an iron producing material and with sufficient carbon to reduce to silicon at least a part of the silicon oxide in said material, subjecting said mixture to heat sufficient to reduce at least a part of the said silicon oxide, thereby producing an alloy containing silicon and iron and producing unreduced oxide, and separating the said alloy from the oxide.

11. Process of concentrating beryllium oxide occurring in materials containing beryllium silicate and aluminum silicate, which comprises admixing such a material with sufficient carbon to reduce to silicon at least a part of the silicon oxide in said material, adding to said material an iron producing material in amount sufficient to produce an alloy with the said silicon containing not less than 50% of iron, subjecting the mixture to heat sufficient to reduce at least a part of the said silicon oxide, thereby producing an alloy containing silicon and not less than 50% of iron and producing unreduced oxide, and separating the said alloy from the oxide.

12. Process of concentrating beryllium oxide occurring in materials containing beryllium silicate and aluminum silicate, which comprises admixing such a material with sufficient carbon to reduce to silicon at least a part of the silicon oxide in said material and with sufficient iron to form an alloy with the said silicon containing not less than 50% of iron, subjecting the mixture in a suitable furnace to heat sufficient to reduce at least a part of the silicon oxide in said material, thereby producing an alloy containing silicon and not less than 50% of iron and producing unreduced oxide, introducing heat sufficient to liquefy the said alloy and to liquefy the oxide tapping said alloy and oxide from the said furnace, permitting the alloy and oxide to stratify, and separating the oxide from the said alloy.

13. Process of concentrating beryllium oxide occurring in materials containing beryllium silicate and aluminum silicate, which comprises admixing such a material with sufficient carbon to reduce to silicon the silicon oxide in said material, subjecting the mixture to heat sufficient to cause the admixed carbon to reduce to silicon the silicon oxide, thereby producing silicon and unreduced oxide, and separating the said silicon from the oxide.

14. Process of concentrating beryllium oxide occurring in materials containing beryllium silicate and aluminum silicate, which comprises admixing such a material with an iron producing material and with sufficient carbon to reduce to silicon the silicon oxide in said material, subjecting said mixture to heat sufficient to reduce the said silicon oxide, thereby producing an alloy containing silicon and iron and producing unreduced oxide, and separating the said alloy from the oxide.

15. Process of concentrating beryllium oxide occurring in materials containing beryllium silicate and aluminum silicate, which comprises admixing such a material with sufficient carbon to reduce to silicon the silicon oxide in said material, adding to said material an iron producing material in amount sufficient to produce an alloy with the said silicon containing not less than 50% of iron, subjecting the mixture to heat sufficient to reduce the said silicon oxide, thereby producing an alloy containing silicon and not less than 50% of iron and producing unreduced oxide, and separating the said alloy from the oxide.

16. Process of concentrating beryllium oxide occurring in materials containing beryllium silicate and aluminum silicate, which comprises admixing such a material with sufficient carbon to reduce to silicon the silicon oxide in said material and with sufficient iron producing material to form an alloy with the said silicon containing not less than 50% of iron, subjecting the mixture in a suitable furnace to heat sufficient to reduce the silicon oxide, thereby producing an alloy containing silicon and not less than 50% of iron and producing unreduced oxide, introducing heat sufficient to liquefy the said alloy and to liquefy oxide tapping said alloy and said oxide from the said furnace, permitting the alloy and oxide to stratify, and separating the alloy from the oxide.

LOUIS BURGESS.